July 28, 1936.       H. F. SAMSTAG        2,049,178
EDUCATIONAL TOY
Filed Aug. 27, 1935
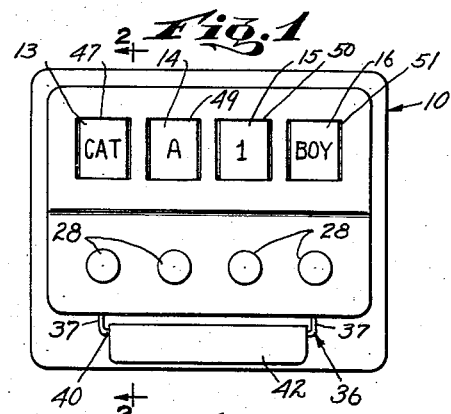
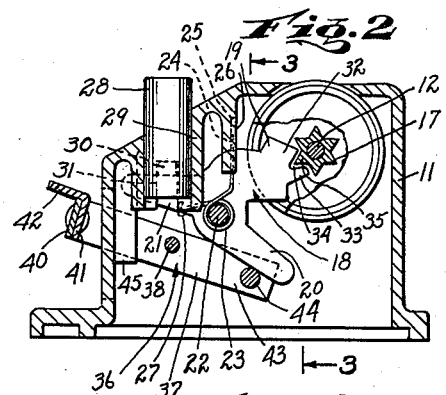
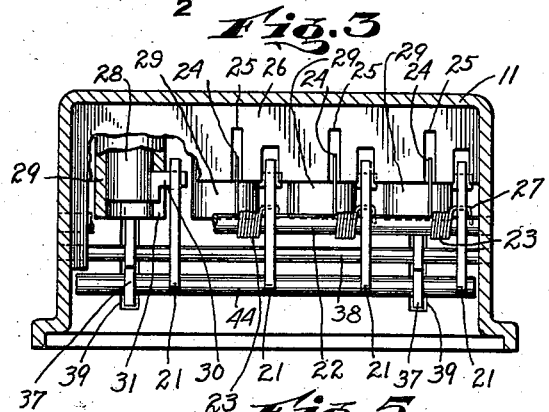
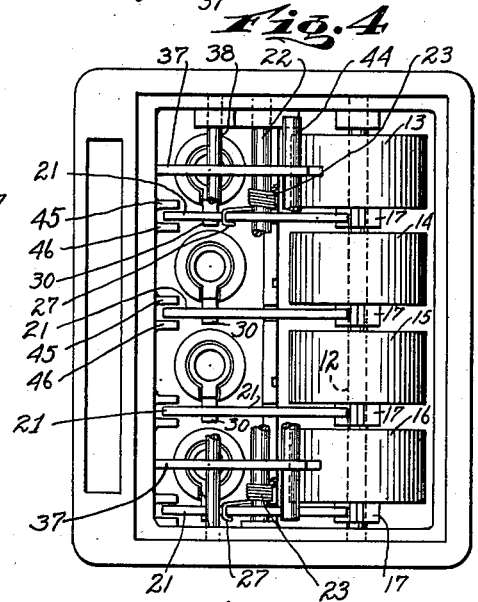
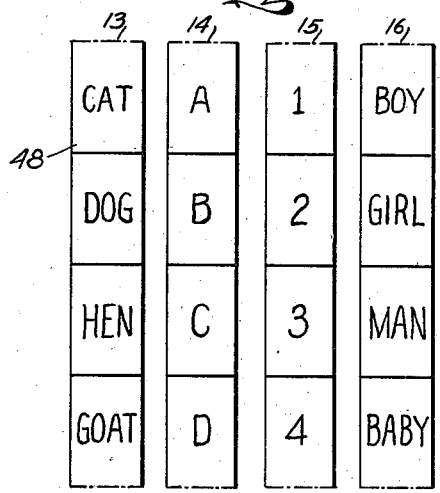
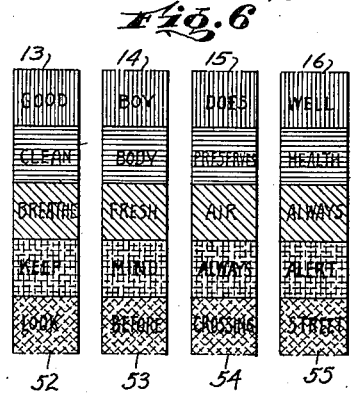
INVENTOR
Henry F. Samstag
BY
ATTORNEY Patented July 28, 1936

2,049,178

UNITED STATES PATENT OFFICE 2,049,178

EDUCATIONAL TOY

Henry F. Samstag, New York, N. Y.

Application August 27, 1935, Serial No. 38,014

11 Claims. (Cl. 35—5)

The present invention relates to toys and more particularly is concerned with an educational toy comprising a plurality of rotatable dials carrying appropriate indicia or fanciful pictorial designations registerable with suitably disposed openings of the casing thereof.

The invention has as one object the provision of a novel educational and attractive toy embodying spaced rotatable dials selectively controlled or simultaneously operated by conveniently disposed and readily accessible depressible means.

The invention contemplates as a further object the provision of an improved educational toy characterized by a plurality of indicia carrying rotatable dials simultaneously actuated by a common swingable member overhanging a forward wall of the casing.

The invention comprehends as a further object the provision of a plurality of selectively rotatable dials carrying elementary information or pictorial displays for sustaining the interest of a child or user.

The invention has as a further object the provision of a plurality of rotatable dials each having a variegated color scheme, the corresponding colors of the several dials, if matched defining a complete thought, helpful in the matter of teaching the child or user valuable and constructive facts or suggestions.

Other objects, advantages and features of the invention are in part obvious and in part specifically pointed out hereinafter.

The invention accordingly comprises features of construction, combination of elements, and arrangement of parts exemplified in the construction hereinafter especially set forth in detail and the scope thereof will be more particularly pointed out in the appended claims.

For a clearer understanding of the invention and how all of the features, advantages and objects thereof are accomplished and carried into effect attention is directed to the embodiment shown in the accompanying drawing in which:

Fig. 1 is a plan view of the educational toy according to the invention.

Fig. 2 is a section on the line 2—2 of Fig. 1.

Fig. 3 is a section on the line 3—3 of Fig. 2.

Fig. 4 is a longitudinal underneath view of Fig. 1, shown on a slightly larger scale.

Fig. 5 is a fragmentary development of the indicia carrying rotatable dials and

Fig. 6 is a continued development of the information carried by the rotatable dials schematically illustrated in Fig. 5.

Illustrative of the embodiment according to the invention, the educational toy is generally designated 10 and comprises a hollow casing 11 carrying a fixed longitudinally disposed cylindrical rod or spindle 12 on which is freely and rotatably mounted a plurality of spaced dials or cylinders 13, 14, 15, and 16 each having an overhanging ratcheted or star wheel 17 secured thereto and also rotatable relative the common sustaining rod 12.

Each star wheel is actuated by a respective irregularly shaped bell crank lever or yoke broadly denoted 18 each comprising rearwardly disposed arms 19 and 20 and a forwardly arranged extension 21. As illustrated, the four extensions 21 for the four rotatable dials 13, 14, 15, and 16 are integral with companion spaced arms 19 and 20 of an associated yoke 18 and each of the latter is rotatably mounted on a longitudinally disposed spindle 22 fixedly carried by the spaced sides of the casing.

Normally each extension 21 of the several yokes 18 is held in a raised position by a respective helicoidal spring 23, wound about fulcrum rod 22, each spring 23 having an end 24 appropriately retained in a companion vertical slot 25 arranged in a depending portion 26 integral with the casing and another end 27 appropriately anchored to an adjacent extension 21.

Associated with each extension 21 of the several yokes 18 is a manually depressible cylindrical plunger 28 slidably disposed in a companion depending bushing or sleeve 29 integrally carried by the casing.

The several plungers 28 are each provided with a laterally extending lug 30 slidably guided in a vertical slot 31 of a companion bushing 29 and each lug overhangs or extends beyond an associated extension 21 of a respective yoke 18. If therefore, a plunger 28 be manually depressed its lug 30 actuates an associated extension 21 causing the yoke thereof to bodily rotate about fulcrum rod 22 and against the energy of a companion spring 23. Thus arm 19 of the actuated yoke is elevated.

It will be noted that arm 19 of each yoke comprises spaced teeth 32 and 33 defining an interlocking groove 34. If therefore, an arm 19 is raised (see Fig. 2), tooth 33 actuates an adjacent tooth 35 of a companion star wheel 17. It follows that the imparted force applied to tooth 35 causes the star wheel thereof to bodily rotate and consequently its dial will be also rotated.

When a plunger has been completely depressed, the tooth 33 of its actuated yoke is completely free of its star wheel and the latter is free to revolve about spindle 12 until the driving force imparted thereto has been dissipated. However, upon removal of manual pressure from the selected plunger actuated, the plunger is automatically restored to an elevated normal poosition by reason of the release of a companion spring 23, hence extension 21 of the yoke previously actuated is raised and groove 34 of spaced teeth 32 and 33 receives a tooth 35 of the star wheel, consequently interlocking with the latter, thus precluding accidental rotation of its respective dial.

According to the invention, the several dials may be simultaneously actuated. To this end a swingable U shaped bar generally denoted 36 has its spaced sides 37 pivotally sustained on a longitudinally disposed rod 38 fixedly carried by the sides of the casing. Sides 37 of bar 36 extend through vertically arranged slots 39 in the forward wall of the casing while the forward longitudinal brace or bar 40 interconnecting spaced sides 37 is disposed in spaced relation with the forward wall of the casing. Attached to brace 40 is an angle iron member 41 which comprises a forwardly projecting lip or flange 42.

Appropriately connected to the rear ends 43 of spaced sides 37 is a rod 44 which serves a common actuator for corresponding lower arms 20 of the several dial actuating yokes 18. More particularly, rod 44 when raised abuts all of lower arms 20 of the several yokes 18 and consequently their respective gears or star wheels 17 will be struck at one time, hence, the several dials will be set in motion simultaneously. This operation takes place when lip 42 is manually depressed.

When, however, manual pressure is removed from lip 42, the latter will be automatically restored to its normal elevated position due to the release of the several helicoidal springs 23. Of course, if the U shaped bar 36 is actuated, all of the plungers 28 will be automatically depressed at one time by reason of the operation of lugs 30 coacting with respective extensions 21 and all of the plungers will be raised automatically and simultaneously when manual pressure is removed from lip 42. This function takes place due to simultaneous release of several springs 23. After having been actuated simultaneously and pursuant to release of the several springs 23, the dials are held in a nonrotatable relation by reason of the interlocking action of the spaced teeth 32 and 33 of the several yokes with adjacent teeth of respective star wheels, it being noted that when a yoke is actuated, the forward extension 21 thereof is slidably guided between a pair of spaced ribs 45 and 46.

Various effects may be obtained in selectively or simultaneously actuating the several dials herein specifically referred to. For example if it is desired to register the word "cat", dial 13 is actuated by depressing its plunger 28 permitting the dial to spin. Subsequently manual pressure is removed from the plunger depressed and a certain frame as 48 of the dial may appear before window 47 of the casing. If another word other than "cat" appears before window 47 of the upper wall of the casing, the plunger is again depressed and released until the desired word is registered, that is, at a time when the desired frame of the dial selected appears before the opening or window 47.

In a similar fashion, the various letters of the alphabet may be selectively registered in window 49 by actuating plunger 28 associated with dial 14. If registration of a particular numeral is desired, plunger 28 of dial 15 is employed and the indicia of the latter registers with window 50. Again if an expression of dial 16 is desired, the plunger thereof is actuated and a selected expression carried by dial 16 is framed in the opening or window 51.

Where it is desired to test a child's mind, the several dials are simultaneously operated by actuating and releasing lip 42. In this connection, various indicia of the several frames of the plurality of dials appear before respective windows of the casing. Hence the child may be asked to repeat orally the several readings of the various frames registered.

Further in accordance with the present invention, corresponding colors may be matched to dispose in alinement helpful expressions to indelibly impress the child's mind with important facts or fanciful pictorial displays. For instance, each of the several dials may be selectively actuated by a respective plunger, until corresponding frames 52, 53, 54, and 55 register with respective windows of the casing. These frames are all colored in orange. And the corresponding expression for the alined orange colored frames is "Look before crossing street." In a similar way, the red, blue, green and yellow colored frames of the several dials may be lined up or matched and registered. If matched, the red color frames, dictate "Good boy does well", the alined blue colored frames read, "Clean body preserves health", the alined green frames, "Breathe fresh air always"; and the alined yellow frames "Keep mind always alert". Hence with the present invention, not only are interesting and educational facts brought to the child's attention, but an educational toy is provided which is relatively easy to operate, which is attractive to the child, and which from the standpoint of manufacture may be made at a relatively low cost and it is within the province of the invention to have the various expressions such as appearing in the frames of the several dials developed in Figs. 5 and 6 to schematically represent where expedient fanciful or pictorial displays of the equivalent expression, the various pictures or fanciful ornamental showings having been omitted for simplicity of illustration and specification although readily apparent.

The foregoing description has been given by way of example for the sake of facilitating understanding the construction and operation of the educational toy according to the invention. Hence no unnecessary limitations should be understood and it is intended that the appended claims shall be interpreted as broadly as the state of the art permits.

I claim:—

1. In an educational toy, the combination of, a casing having a longitudinally disposed shaft, a plurality of dials rotatable relative to said shaft, selective controlled means for severally actuating the dials of said plurality, and swingable means for actuating said plurality of dials simultaneously.

2. In an educational toy, the combination of, a casing having a longitudinally disposed shaft, a plurality of indicia carrying dials rotatable relative to said shaft and each having a toothed member, pivoted means associated with each member and normally interlocking with the latter, selective means for actuating one of said pivoted means for rotating an associated toothed member and indicia carrying dial, and means common to each of said pivoted means for displacing all of the latter simultaneously for rotating said plurality of dials simultaneously.

3. In an educational toy, the combination of, a casing having a longitudinally disposed shaft, a plurality of indicia carrying dials rotatable relative to said shaft, a pivoted bell crank lever associated with each of said dials and each having spaced arms and an extension, a toothed member carried by each dial and normally interlocking with one of said arms of an associated lever to prevent rotation of a companion dial, depressible means for actuating a toothed member to rotate a companion dial thereof, spring means for automatically restoring said displaceable means pursuant to removal of manual pressure therefrom, and pivoted means common to all of said bell crank levers for actuating the latter simultaneously to rotate said plurality of dials simultaneously.

4. In an educational toy, the combination of, a casing comprising a plurality of spaced openings and having a longitudinally disposed shaft, a plurality of indicia carrying dials rotatable relative to said shaft, a pivoted bell crank lever associated with each dial and each having a grooved portion, a toothed member carried by each of said dials and normally interlocking with a grooved portion of an associated bell crank lever to prevent rotation of a companion dial, a plunger for each of said bell crank levers for imparting rotation to a companion toothed member thereof and to a dial associated with the latter to displace a portion of said last mentioned dial before an opening of said casing, and spring means pursuant to removal of pressure from said actuated plunger for elevating the latter and concomitantly displacing a companion bell crank lever to permit the grooved portion thereof to interlock with a respective toothed member and prevent rotation of the dial associated therewith.

5. In an educational toy, the combination of, a casing comprising a plurality of openings and having a longitudinally disposed shaft, a plurality of display dials rotatable relative to said shaft, a pivoted bell crank lever associated with each dial and each having a pair of spaced arms one of which comprises a grooved portion, a toothed member carried by each of said dials and normally interlocking with a grooved portion of an associated bell crank lever to prevent rotation of a companion dial, a manually depressible plunger for each of said bell crank levers for imparting rotation to a companion toothed member thereof and to a dial associated with the latter to displace a portion of said last mentioned dial before an opening of said casing, spring means pursuant to removal of pressure from a manually depressed plunger for elevating the latter and concomitantly displacing an associated bell crank lever to permit the grooved portion of the latter to interlock with a companion toothed member and prevent rotation of the dial associated therewith, and swingable means adapted to abut other corresponding arms of said pairs of arms for simultaneously actuating said plurality of dials for registering portions thereof with said openings.

6. In an educational toy, the combination of, an elongated casing comprising a plurality of spaced openings and having a longitudinally disposed fixed shaft, a plurality of indicia and/or display carrying spaced dials rotatable relative to said shaft, a pivoted bell crank lever associated with each dial and each having a pair of spaced arms one of which comprises a grooved portion, a toothed member bodily carried by each of said dials and normally interlocking with a grooved portion of an associated bell crank lever to prevent rotation of a companion dial, a depressible plunger for each of said bell crank levers for imparting rotation to a companion toothed member thereof and to a dial associated with the latter to displace a portion of said last mentioned dial before an associated opening of said casing, spring means pursuant to removal of pressure from said actuated plunger for elevating the latter and concomitantly displacing an associated bell crank lever to permit the grooved portion thereof to interlock with a companion toothed member and prevent rotation of the dial associated therewith, and a pivoted actuating bar common to each of said bell crank levers and having means adapted to abut corresponding other arms of said pairs for elevating the grooved portions of the latter for simultaneously rotating said plurality of dials before said openings.

7. In an educational toy, the combination of, a casing having a plurality of openings, a plurality of rotatable dials each having a variegated color scheme, depressible means, and means actuated by said depressible means for disposing corresponding colors of said dials before said openings.

8. In an educational toy, the combination of, a casing having a plurality of openings, a plurality of rotatable dials disposed before said openings and each having an indicia record and a variegated color scheme, depressible means operatively associated with each of said dials, and a connection between each depressible means and a dial for actuating the latter to register a portion thereof with an associated opening of said plurality of openings.

9. In an educational toy, the combination of, a casing having an opening, a rotatable dial within said casing and comprising a gear, a pivoted bell crank lever having an arm interlocking with said gear and adapted to actuate the latter, a depressible plunger for operating said bell crank lever for displacing a portion of said dial with said opening, and spring means for retracting said bell crank lever to interlock with said gear to prevent rotation of said dial.

10. In an educational toy, the combination of, a casing having a plurality of spaced openings, a rotatable dial for each of said openings and having portions adapted to register therewith, a gear carried by each of said dials, a pivoted bell crank lever for each of said gears and operatively associated therewith, depressible plungers operatively connected to said bell crank levers for selectively actuating the latter for rotatably displacing one of said dials, spring means operative pursuant to removal of pressure from one of said plungers to elevate the latter for operating its respective bell crank lever to interlock with a companion gear to prevent rotation of its associated dial, and a pivoted member having means for simultaneously actuating all of said bell crank levers for simultaneously rotating said dials.

11. In an educational toy, the combination of, a casing having a plurality of openings, a shaft disposed longitudinally of said casing and carried thereby, a plurality of indicia carrying dials rotatable relative to said shaft and having portions adapted to be displayed before said openings, a toothed member carried by each dial, pivoted means associated with each member and normally interlocking with the latter, selective depressible means for actuating one of said pivoted means for displacing its respective toothed member to rotate an associated dial to register a portion thereof with its companion opening of said plurality of openings, and swingable means common to each of said pivoted means for displacing all of the latter simultaneously for rotating said plurality of dials simultaneously to register portions of said plurality of dials with said plurality of openings.

HENRY F. SAMSTAG.